United States Patent
Holtel et al.

(10) Patent No.: US 8,509,413 B2
(45) Date of Patent: Aug. 13, 2013

(54) DEVICE AND METHOD FOR RECOGNIZING WANTED AND/OR UNWANTED TELEPHONE CALLS OF A TELEPHONE USER AS A FUNCTION OF THE USER'S BEHAVIOR

(75) Inventors: Stefan Holtel, Unterhaching (DE); Matthias Fischer, Munich (DE)

(73) Assignee: Vodafone Holding GmbH, Duesseldorf (DE)

( * ) Notice: Subject to any disclaimer, the term of this patent is extended or adjusted under 35 U.S.C. 154(b) by 223 days.

(21) Appl. No.: 12/803,483

(22) Filed: Jun. 28, 2010

(65) Prior Publication Data

US 2011/0116615 A1    May 19, 2011

(30) Foreign Application Priority Data

Jun. 26, 2009  (DE) .......................... 10 2009 030 699

(51) Int. Cl.
*H04M 3/42* (2006.01)

(52) U.S. Cl.
USPC ............ 379/210.02; 379/201.01; 379/201.03; 379/201.04

(58) Field of Classification Search
USPC .............. 379/210.02, 201.01, 201.03, 201.04
See application file for complete search history.

(56) References Cited

U.S. PATENT DOCUMENTS

| 7,903,796 B1 * | 3/2011 | Kheradpir et al. ......... 379/88.17 |
| 2007/0071212 A1 * | 3/2007 | Quittek et al. ........... 379/210.02 |

FOREIGN PATENT DOCUMENTS

| DE | 10 2006 023 924 A1 | 11/2007 |
| DE | 10 2006 027 386 A1 | 12/2007 |

* cited by examiner

Primary Examiner — Quynh Nguyen
(74) Attorney, Agent, or Firm — Kriegsman & Kriegsman

(57) ABSTRACT

Device and method for recognizing wanted and/or unwanted telephone calls of a telephone user as a function of the user's behavior. The device has an interface to at least one telephone of the user and an interface to at least one media terminal. A mechanism determines the input of a telephone call on the user's telephone. An examining mechanism establishes a spatial relationship between the user's telephone and the media terminal. A detection mechanism detects the activation state of the media terminal. A tapping mechanism taps the media content playing on the media terminal at the time point of the input of a telephone call on the user's telephone. A comparison mechanism compares the media content during an incoming call on the user's telephone with the media content of Event Files of a User Profile stored in a storage mechanism. A determining mechanism determines whether a call is wanted.

16 Claims, 1 Drawing Sheet

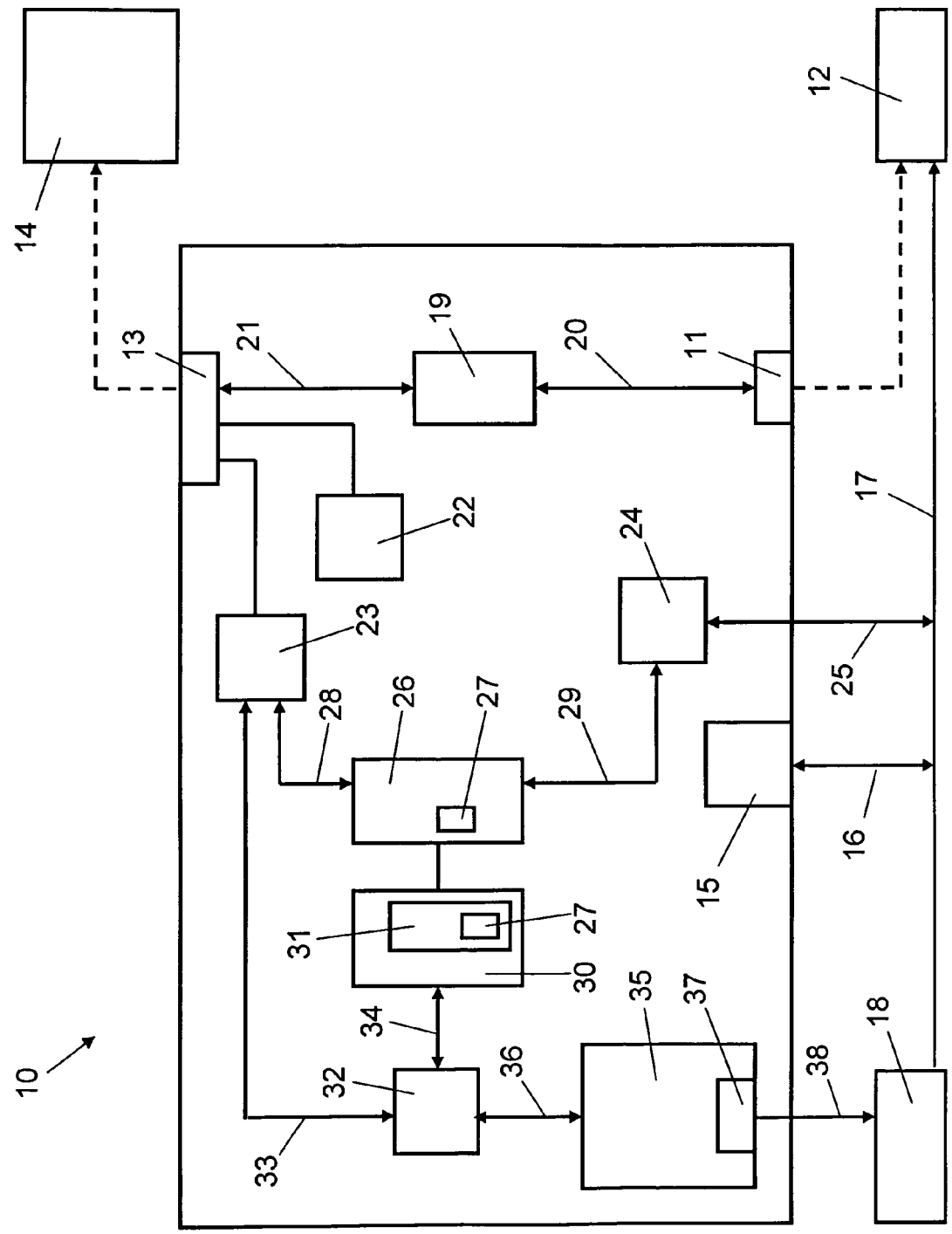

DEVICE AND METHOD FOR RECOGNIZING WANTED AND/OR UNWANTED TELEPHONE CALLS OF A TELEPHONE USER AS A FUNCTION OF THE USER'S BEHAVIOR

CROSS-REFERENCE TO RELATED APPLICATIONS

The present application claims foreign priority under 35 U.S.C. 119 to German Patent Application No. 10 209 030 699.4, filed Jun. 26, 2009, the disclosure of which is incorporated herein by reference.

BACKGROUND OF THE INVENTION

The present invention first relates to a device for recognizing wanted and/or unwanted telephone calls of a telephone user as a function of the user's behavior. In addition, the present invention relates to a method for creating a User Profile for recognizing wanted and/or unwanted telephone calls of a telephone user as a function of the user's behavior, by means of a device that has an interface to at least one telephone of the user and an interface to at least one media terminal, in particular, a wireless device (radio) or TV set. Finally, the invention also relates to a method for recognizing wanted and/or unwanted telephone calls of a telephone user as a function of the user's behavior by means of a device that has an interface to at least one telephone of the user and an interface to at least one media terminal, in particular, a wireless device (radio) or TV set.

The situation often occurs that the user of a telephone is disturbed by an incoming telephone call while he is engaged in another activity, for example, while he is viewing a TV broadcast, listening to a radio broadcast, surfing the Internet, or similar activities. On the part of the user, this often leads to frustration, since he must direct his attention to the incoming call and can no longer concentrate on the activity which he was engaged in up to this point. Such situations are also often unpleasant for the caller, since the caller does not know initially whether he is disturbing or interrupting by his phone call the person he is calling who may be engaged in another activity.

For this reason, there is the need to create a possibility, by means of which the user of the telephone is not disturbed by incoming telephone calls that are not wanted at this moment.

Different possibilities are already known in the art, such as unwanted incoming calls can be prevented by blocking. For example, a method is described in DE 10 2006 023 924 A1 for identifying unwanted telephone calls. In this case, the incoming calls are subjected to a test, wherein, on the one hand, the time point of the incoming call is determined. In addition, the probability that this is an unwanted call is determined. In this case, previous unwanted calls are also included in the determination. A similar solution is described in DE 102006 027 386 A1, in which incoming calls are categorized into one of three lists.

SUMMARY OF THE INVENTION

Proceeding from the named art, the object of the present invention is to further develop a device as well as a method of the type named initially in such a way that, in a simple way, incoming calls that might disturb the user of a telephone when he is engaged in an activity—at least while he is exercising his activity—can be kept away.

This problem is solved according to the invention by the device with the features according to the independent patent claim 1, the method with the features according to the independent patent claim 8, as well as the method with the features according to the independent patent claim 9. Further features and details of the invention can be taken from the subclaims, the description, as well as the drawing. Thus, features and details that are described in connection with one of the two aspects of the method, of course, also apply to the full extent in connection with the other aspect of the method each time, and vice versa. Likewise, features and details, which are described in connection with the device according to the invention, of course, also apply to the full extent in connection with the method according to the invention, and vice versa.

The present invention in its different aspects of invention provides a solution in which a specific context is determined, for example, media content, and in which, in addition, it is determined whether the user of the telephone in this context wants to be disturbed by an incoming call.

Here, this involves a self-learning system, which automatically learns and is further trained with each additional incoming call. How this is accomplished in individual steps will be explained in detail in the further course of the description.

If a call comes in for the user of the telephone, the user of the telephone has two possibilities. Either he accepts the call or he rejects the call. Both are recorded and recognized by the device. In addition, the device taps the above-mentioned context, for example, media content. For this purpose, advantageously, an analysis of content is carried out, such as is explained in greater detail in the further course of the description.

With the solution according to the invention, it can be achieved, in particular, that unwanted incoming telephone calls can be blocked on the telephone of a user while the user is engaged in a specific activity, for example, while the user watches a specific TV program.

The present invention thus provides an intelligent link between a specific activity, for example, the broadcast of a specific TV program and a telephone of the user, for example, a mobile telephone, in order to extensively increase the user's comfort during his activity, so that he is not disturbed by unwanted telephone calls while he is engaged in it, and/or so that the user can decide whether he would or would not like to accept an incoming telephone call.

The present invention thus generates possibilities for blocking unwanted incoming calls on a telephone or for redirecting them, for example, to a later time point.

The basic technical concept of the method is such that a profile of the user is filed in the device, which is made up of the previous activities of the user, for example, with respect to the blocking/redirecting of incoming calls. Then, if activities corresponding to these are recognized later, an incoming call is blocked/redirected, based on this knowledge. In addition, the user can provide specific telephone numbers for which no blocking/redirecting of this type would apply.

Consequently, the basic technical method involves a type of filtering system, by means of which specific incoming telephone calls with specific prerequisites are blocked/redirected.

This technical method is conducted according to the present invention advantageously in conjunction with a preferred example of embodiment. Of course, the invention is not limited to this one preferred embodiment example. In this example of embodiment, the profile of the user is established based on his TV viewing priorities. The TV program which the user is viewing is analyzed, for example, by checking a so-called Electronic Program Guide (EPG). The profile is then prepared in such a way that the device examines when incoming calls are blocked by the user and what program is playing on TV at that time. This is conducted, for example, by a corresponding analysis of the Electronic Program Guide. Then, when a corresponding program is playing at a later time, incoming calls will be equally blocked/redirected by the system as long as they are not from excepted telephone numbers.

How the effects of the solution according to the invention can be achieved will be described below in greater detail.

According to the first aspect of the invention, a device is provided for recognizing wanted and/or unwanted telephone calls of a user of a telephone as a function of the user's behavior, a device that has the following features:
an interface to at least one telephone of the user;
an interface to at least one media terminal, in particular, a wireless device (radio) or a TV set;
a mechanism for determining the input of a telephone call on the telephone of the user;
an examining mechanism for determining a spatial relationship between the telephone of the user and the media terminal;
a mechanism for detecting the activation state of the media terminal;
a mechanism for tapping the media content provided on the media terminal at the time point of the input of a telephone call on the user's telephone;
a mechanism for extensively determining the user's behavior, whether the user accepts or rejects an incoming telephone call when the media content is playing;
a mechanism for coupling the media content and the user's behavior relative to accepting or rejecting the incoming telephone call to an Event File;
a storage mechanism for storing the Event Files for creating a User Profile;
a comparison mechanism for comparing the media content during an incoming call on the telephone of the user with the media content from Event Files of the User Profile, which are stored in the storage mechanism;
a mechanism for establishing whether, as a result of the comparison, a call is wanted or unwanted.

The device according to the invention serves for recognizing wanted and/or unwanted telephone calls of a telephone user as a function of the user's behavior. A wanted telephone call, for example, is a call that the user would like to accept. An unwanted telephone call, for example, is a call that a user would not like to accept temporarily, at a certain time, for example, when he is watching a specific TV program or a specific type of TV program.

It is not just a matter of generally blocking basically unwanted calls, so-called spam calls. Rather, it involves suppressing specific incoming calls at specific times during which the user is engaged in a specific activity, for example, during which he is watching a specific TV program. These specific activities involve a user's behavior.

The user is not limited to the use of specific types of telephone. For example, he can use wired or wireless telephones. In an advantageous embodiment, the device serves for blocking unwanted telephone calls on a mobile telephone of a user while he views a specific TV program or s specific type of TV program.

The device, first of all, has an interface to at least one telephone of the user.

In addition, the device also has an interface to at least one media terminal. The media terminal generally involves a terminal by means of which media content can be made available to a user. Advantageously, the media terminal may involve a TV set, by means of which media content is provided in the form of TV programs, which are preferably transmitted via cable or broadcast. In a similar way, the media terminal can be designed as a wireless receiver, as a computer with internet access, or the like.

In addition, the device advantageously also has an interface to at least one telephone of a caller, who calls or would like to call the user of the telephone.

Each time depending on the configuration, the device can be provided as a separate unit, which then must be able to communicate with the media terminal, the telephone of the user and the telephone of the caller. Advantageously, it can also be provided that the device is furnished in the telephone, in particular, a mobile telephone of the user, or in a media terminal, in particular, a TV set or a wireless device (radio).

The device according to the invention provides a mechanism for determining the input of a telephone call on the user's telephone. When a telephone call comes in, it involves a telephone call which is directed to the telephone user who is just now engaged in a specific activity, for example, who is watching a specific TV program, and the call will then be accepted or rejected by the user. Incoming telephone calls of this type are usually specified by a unique telephone number that identifies the telephone of a caller (caller ID).

In addition, the device also provides an examining mechanism for determining a spatial relationship between the telephone of the user and the media terminal. In this way, it is assured that the device according to the invention as well as the method according to the invention, which is described further below, are only activated when the user's telephone and thus the user himself are found at a distance to the media terminal such that it can result therefrom that the user is actually engaged in the terminal at this time.

In addition, there is a mechanism for detecting the activation state of the media terminal. In this way, it is determined whether the media terminal is also actually in operation.

If this is the case, there is a mechanism for tapping the media content playing on the media terminal at the time point of the input of a telephone call on the user's telephone. The media content involves, for example, the content of a TV broadcast, a radio broadcast, an opened internet site, or similar content. It may also be provided in each case, depending on the configuration, that the media content involves a specific title, a type of content, or the like.

This will be illustrated on the basis of a concrete, non-exclusive example. For example, the media content may involve a specific newscast broadcast on N. For example, it is conceivable that the media content involves the title of the newscast, or it may instead involve the topic of the TV broadcast, here "newscast" or similar topic. Media content can thus be made up of specific titles of programs, subjects of programs, and the like.

In addition, the device according to the invention provides a mechanism for extensively determining the user's behavior, whether the user accepts or rejects an incoming telephone call when the media content is playing.

This information, namely the user's behavior in the form of accepting or rejecting a call when a specific media content is playing, is coupled to an Event File in a mechanism for coupling the media content and the user's behavior relative to accepting or rejecting the incoming telephone call. The Event File thus provides information of whether a user accepts or rejects specific incoming telephone calls when specific media content is playing on the media terminal.

The Event Files obtained in this way are stored in a storage mechanism for storing Event Files for creating a User Profile.

In addition, the device provides a comparison mechanism for comparing the media content during an incoming call to the telephone of the user with the media content from Event Files of the User Profile, which are stored in the storage mechanism. Thus, the device can examine specific behavior patterns of the user over time for specific media content. A User Profile is constructed in the form of a pattern, which reflects the interests of a user relative to accepting or rejecting specific incoming calls on his telephone in the case of specific media content playing on the media terminal.

Finally, the device also provides a mechanism for determining whether, as a result of the comparison, a call is wanted or unwanted. The device can then take suitable action in regard to the caller, as will be explained in more detail in the further course of the description.

In such a case, if a call comes in to the user, the device first examines whether the media terminal is turned on and whether the user's telephone is found in a spatial relationship to the media terminal. If this is the case, it is concluded that that the user and his telephone are found in front of the media terminal and, for example, the user is viewing a TV broadcast.

Now, if a call comes in for the user, the device first taps the media content that is just now playing on the media terminal. Then the device examines whether Event Files with similar media content are present in the storage mechanism. If this is the case, the device examines how the user has behaved in the past with respect to accepting or rejecting incoming telephone calls. Based thereon, the device reacts relative to the incoming telephone call.

This will be described on the basis of a concrete, non-exclusive example. For example, the call comes in while the telephone user is viewing a newscast on his TV. The device determines the media content "newscast" and checks the User Profile to determine whether other Event Files with media content "newscast" are found stored therein. If this is the case, the device additionally examines how the user has behaved in these cases. If, for example, the user has rejected incoming calls in these cases, the device proceeds from the fact that in the present situation, a call would also be rejected and so the incoming telephone call is rejected.

The device according to the invention thus creates the possibility of finding information on whether this recipient would or would not want to accept incoming telephone calls by analysis of current media content, for example, audio and/or video streams playing on a selected TV channel and the behavior of this recipient of media content. Thus, not only can the current content of a type of media content be determined. Rather, it is also possible in this way to recognize specific types of media content, for example, the type "newscast", and to determine whether the user would want to receive or would want not to receive calls in general on his telephone when he is viewing such media content, for example during a newscast.

In this way, it can advantageously be provided, resulting from the comparison in the device, that a determination of whether a call is wanted or not wanted is made as soon as a pregiven limiting value is reached or exceeded. Thus it can be assured that a previous rejection of a call was not simply an exception. Coming back to the above example, this could mean, for example, that the device examines the number of Event Files with the media content "newscast" during which the user has rejected an incoming call in the past. In this case, if it is determined that a pregiven limiting value is exceeded, for example, that an incoming call has been rejected more than 10 times, the device determines that the user generally would not like to accept incoming calls during the media content "newscast". Then, if such a pattern occurs in a later case, the incoming call will be rejected beforehand by the device.

It is advantageously provided that the device is designed for tapping media content provided on the media terminal, for analyzing an Electronic Program Guide transmitted on the media terminal, and/or for detecting a channel by means of which the media content is shown on the media terminal. An Electronic Program Guide (EPG) is generally electronically disseminated information on currently playing radio and TV programs. The data today are usually broadcast as an additional service by the transmitting services. By detecting the channel, information can be found as to which channel is just now turned on in the media terminal. The determination of media content will be made still more accurate in this way. In addition to specific media content, for example, "newscast", it can also be determined in this way which channel is running this TV broadcast. In this way, the user can successfully have incoming telephone calls rejected only during very specific newscasts that are broadcast on specific channels, but not for newscasts in general. By analyzing the EPG, it is also possible to determine how long the corresponding broadcast lasts, so that incoming calls may possibly be shifted to a time after the newscast has terminated.

Preferably, the mechanism for tapping media content provided on the media terminal can be designed for content analysis of audio data and/or video data and/or text data. Of course, combinations are also conceivable. If the media content involves video data, for example, additional information may also be considered for tapping the media content, for example, text information for the hearing impaired or similar information.

In another configuration, the mechanism can be designed for coupling in an Event File the media content, the user's behavior relative to accepting or rejecting the incoming telephone call, as well as the telephone number of the calling telephone. In this way, information can also be obtained of whether the user would like to reject only calls from certain callers who are identifiable based on their telephone numbers when the media content is playing.

Advantageously, the mechanism for determining whether a call is wanted or not wanted resulting from the comparison can have means for sending a communication of a rejected call to the telephone of the caller and/or to the telephone of the user when a call is rejected. Alternatively or additionally, it can be provided that the mechanism for determining whether a call is wanted or not wanted resulting from the comparison can have means for blocking, redirecting or relaying a rejected call.

Preferably, the device can have a storage mechanism containing telephone numbers of preferred callers, which interacts with the mechanism for determining whether a call is wanted or not wanted resulting from the comparison. In this way, it is made possible for the user to indicate specific telephone numbers from which he wants to receive telephone calls, independently of his other criteria, even if he is directly engaged in another activity. The user can thus indicate telephone numbers for those incoming calls that should be put through at any time in each case. The user can advantageously freely determine these telephone numbers and enter them in the device, process them in it, but also can remove them again from the device.

It is also advantageously possible that the user enters specific time periods during which he always would like to receive incoming telephone calls, and, in fact, also independently of whether he is directly engaged in another activity, for example, regardless of whether he is viewing a certain TV program.

In order to be able to operate a device according to the invention as described above, it is necessary that first a corresponding User Profile is created. Since the device is preferably designed to be self-learning, such a User Profile is continuously modified and refined over time, so that more accurate information regarding the media content during which the user of the telephone will accept which incoming calls, and which he will not, is continuously made possible as the method is used increasingly over time.

According to a second aspect of the invention, a method is provided for creating a User Profile for recognizing wanted and/or unwanted telephone calls of a telephone user as a function of the user's behavior, wherein the method is carried out by means of a device that has an interface to at least one telephone of the user and an interface to at least one media terminal, particularly a wireless device (radio) or a TV set, and that is particularly designed in a way as further described above according to the invention. This method is characterized by the following steps according to the invention:

a determining mechanism of the device determines the input of a telephone call on the user's telephone;
an examining mechanism of the device establishes a spatial relationship between the telephone of the user and the media terminal;
a detection mechanism detects the activation, state of the media terminal;
a tapping mechanism taps the media content playing on the media terminal at the time point of the input of a telephone call on the user's telephone;
a determining mechanism extensively determines the user's behavior, whether the user accepts or rejects an incoming telephone call when the media content is playing;
a coupling mechanism links the media content and the user's behavior relative to accepting or rejecting the incoming telephone call in an Event File;
the Event File is stored in a storage mechanism for creating a User Profile.

Reference is made to the statements given above for the device according to the invention to the full extent also for the advantages, features, effects and functioning of this method.

According to a another aspect of the invention, a method is provided for recognizing wanted and/or unwanted telephone calls of a telephone user as a function of the user's behavior, wherein the method is conducted by means of a device that has an interface to at least one telephone of the user and an interface to at least one media terminal, in particular, a wireless device (radio) or a TV set, and that is particularly designed in the way according to the invention as described further above, whereby the method is characterized by the following steps:

a determining mechanism of the device determines the input of a telephone call on the user's telephone;
an examining mechanism of the device establishes a spatial relationship between the telephone of the user and the media terminal;
a detection mechanism detects the activation state of the media terminal;
a tapping mechanism taps the media content provided on the media terminal at the time point of the input of a telephone call on the user's telephone;
a comparison mechanism compares the media content during an incoming call on the telephone of the user with the media content from Event Files of the User Profile, which are stored in the storage mechanism, whereby the Event Files are constructed as couplings of media content and the user's behavior relative to accepting or rejecting the incoming telephone call during the time period of transmission of the corresponding media content;
a mechanism for determining whether, as a result of the comparison, a call is wanted or unwanted.

Reference is made to the statements given above for the device according to the invention to the full extent also for the advantages, features, effects and functioning of this method.

Preferably, the User Profile containing the Event Files is created according to the method of the invention described further above.

It can be advantageously provided that a determining mechanism extensively determines the user's behavior, whether the user accepts or rejects an incoming telephone call when the media content is playing, that a coupling mechanism links the media content and the user's behavior relative to accepting or rejecting the incoming telephone call in an Event File, and that the Event File is stored in the storage mechanism for updating the User Profile.

It is advantageously provided in another configuration that the mechanism for tapping media content playing on the media terminal analyzes an Electronic Program Guide transmitted on the media terminal, and/or detects a channel by means of which the media content is shown on the media terminal.

Preferably, the mechanism for tapping media content playing on the media terminal can analyze the media content with respect to audio data and/or video data and/or text data.

Advantageously, the Event File can be generated by coupling the media content, the user's behavior relative to accepting or rejecting the incoming telephone call, as well as the telephone number of the calling telephone.

In another configuration, it is advantageously provided that in the determination that involves a wanted or unwanted call resulting from the comparison, when the telephone call is rejected, a communication relative to the rejected call is sent to the telephone of the caller and/or to the telephone of the user, and/or the mechanism for determining whether, as a result of the comparison, a call is wanted or unwanted, if an incoming call identified as rejected, blocks, redirects, or relays this call.

Advantageously, the device can have a storage mechanism containing telephone numbers of preferred callers, which interacts with the mechanism for determining whether a call is wanted or not wanted resulting from the comparison, so that for an incoming call, the telephone number of the calling telephone is compared with the telephone numbers of preferred callers, and when it is determined that it agrees therewith, the call is put through to the user's telephone, regardless of the media content.

A number of advantages are provided by the present invention. These will be illustrated on the basis of an advantageous, but non-exclusive example of embodiment, in which a user of a telephone, in particular a mobile telephone, would like to have incoming calls from another subscriber rejected when the user is viewing a specific TV program.

Previously, there existed the problem that such a user was often interrupted by incoming calls when he was viewing a specific TV program. This affected both the user as well as the caller. The user viewing the TV program was often frustrated, since he had to direct his attention to the incoming call and away from the TV broadcast. In contrast, the caller was then often unhappy when he realized that he had disturbed the user while he was viewing the TV program.

It is now possible, by means of the solution according to the invention, to reject or to redirect or to relay to a suitable later time point incoming calls that the called user would not like to accept during the TV broadcast.

The solution according to the invention is self-learning and learns to accept or to reject incoming calls from the behavior of the user by analyzing and understanding media content, in this case the TV program. The solution according to the invention can thus distinguish between relevant and non-relevant incoming calls while the user watches a TV broadcast by utilizing preferences filed in a User Profile. The solution according to the invention, in particular, provides a novel connection between a telephone, a media terminal, a mechanism for selecting a TV channel and an Electronic Program Guide.

Event Files, which present a user's behavior with respect to accepting/rejecting incoming calls during specific TV broadcasts in the past are filed in the User Profile. Conclusions can now be drawn relative to the user's behavior also for current TV broadcasts based on this information. Such calls, which are classified as disturbing for the user, can then be rejected from the start. Nevertheless, it is also still possible to be able to put through specific calls that have an increased priority at any time, independently from the existing User Profile. Consequently, in the solution according to the invention, a user who is viewing a TV broadcast is interrupted by an incoming call only if this number is found in the User Profile. Calls that do not match, in contrast, are rejected, at least for the duration of the TV broadcast.

If the device, which is found, for example, inside the telephone of the user, receives an incoming call, the device determines the channel on which the TV broadcast is playing as well as the Electronic Program Guide, in order to tap the media content in this way. In addition, the user's behavior in earlier cases is examined and it is determined whether the telephone number of the caller is found on the list containing the preferred telephone numbers. Based on this information, the device then decides whether an incoming call will be accepted or rejected. After conducting this procedure, the behavior of the user is recorded in the current case and is stored in the User Profile as an additional, current Event File, whereby the User Profile is newly calculated and updated.

BRIEF DESCRIPTION OF THE DRAWING

The invention will be explained in more detail below based on an embodiment example with reference to the attached drawing. Here, the single FIGURE shows a schematic representation of a device according to the invention, on which the method according to the invention can run.

DETAILED DESCRIPTION OF THE INVENTION

In this example of embodiment, the profile of a user is established based on his TV viewing priorities. The TV program which the user is viewing is analyzed, for example, by examining a so-called Electronic Program Guide (EPG). The profile is then created in such a way that the device examines when incoming calls are blocked by the user and what program is playing on TV at that time. This is done, for example, by a corresponding analysis of the Electronic Program Guide. Then, when a corresponding program is playing at a later time, incoming calls will be equally blocked/redirected by the system, as long as they are not from excepted telephone numbers.

In order to conduct the method, a device 10 is provided for recognizing wanted and/or unwanted telephone calls of a user of a telephone 12 as a function of the user's behavior.

Device 10 first provides an interface 11 to at least one telephone 12 of the user, as well as an interface 13 to at least one media terminal 14, in particular, a TV set. The device can communicate with telephone 12 and media terminal 14 via these interfaces 11, 13, which is illustrated by dashed-line arrows.

Device 10 provides a mechanism 15 for determining the input of a telephone call on telephone 12 of the user. For this purpose, determining mechanism 15 examines whether a telephone call initiated by another telephone 18 is input to telephone 12 of the user, which is symbolized by arrow 17. Since the determination may be different depending on the configuration of the device, this determining step is symbolized only by an arrow 16.

In addition, device 10 provides an examining mechanism 19, by means of which a spatial relationship between telephone 12 of the user and media terminal 14 is determined. For this purpose, examining mechanism 19, for example, determines the position of telephone 12 in a first determining step 20. The position of media terminal 14 is determined in second determining step 21. The determined position values are compared with one another. If the values agree, or if at least a spatial proximity of the position values is recognized, a spatial relationship between telephone 12 and media terminal 14 is determined by examining mechanism 19.

In addition, in device 10, there is a mechanism 22 for detecting the activation state of media terminal 14, by means of which it is determined whether media terminal 14 is activated, i.e., is turned on. Another mechanism 23 serves for tapping the media content provided on media terminal 14 at the time point of the input of a telephone call 17 on telephone 12 of the user.

In a determining step, which is symbolized by an arrow 25, device 10 can extensively examine the user's behavior via a determining mechanism 24, to determine whether the user accepts or rejects an incoming call 17 on telephone 12 when the media content is playing.

This information is transmitted in a coupling step 29 from the determining mechanism 24 to a coupling mechanism 26. Likewise, in a coupling step 28, the media content tapped in mechanism 23 is transferred to coupling mechanism 26. In coupling mechanism 26, the media content and the user's behavior relative to accepting or rejecting the incoming telephone call 17 are linked in an Event File 27.

A storage mechanism 30 is provided for storing the Event File 27 for creating a User Profile 31.

In a comparison mechanism 32 of device 10, in a comparative step 33, the media content is first transferred from mechanism 23 for detecting the media content. In another comparative step 34, the Event Files 27 of User Profile 31 are transferred to comparison mechanism 32. Now, in comparison mechanism 32, the media content during an incoming call 17 on telephone 12 of the user is compared with media content from Event Files 27 of User Profile 31, which are stored in storage mechanism 30. In a determining step, which is symbolized by arrow 36, a determining mechanism 35 determines, as a result of the comparison, whether incoming telephone call 17 involves a wanted or unwanted call.

In addition, mechanism 35 can have means 37 for determining whether a call is wanted or not wanted resulting from the comparison, in order to send a communication on the rejected call to telephone 18 of the caller in the case of a rejected call, which is characterized by arrow 38. Of course, the user of telephone 12 can also receive a corresponding message.

For example, it can be provided that device 10 is provided as a stand-alone unit, which communicates via interfaces 11, 13, as needed, with telephone 12 of the user and with the media terminal. Of course, it can also be provided that device 10 is provided in a telephone 12, in particular, a mobile telephone, or in a media terminal 14, in particular, a TV set.

The present invention thus provides a solution, in which a specific context is determined, for example, a media content, and in which, it is additionally determined whether the user of telephone 12 during this context wants to be disturbed by an incoming call 17. Here, this particularly involves a self-learning system, which automatically learns and is further trained with each additional incoming call 17.

LIST OF REFERENCE SYMBOLS

10 Device for recognizing wanted and/or unwanted telephone calls
11 Interface to a telephone
12 Telephone
13 Interface to a media terminal
14 Media terminal (TV set)
15 Mechanism for determining the input of a telephone call
16 Determining step relative to the input of a telephone call
17 Incoming telephone call
18 Telephone of a caller
19 Examining mechanism
20 Determining step relative to the existence of a spatial relationship
21 Determining step relative to the existence of a spatial relationship
22 Mechanism for detecting the activation state of the media terminal
23 Mechanism for tapping media content
24 Mechanism for determining the user's behavior of whether he will accept or reject a call
25 Determining step
26 Coupling mechanism
27 Event File
28 Coupling step
29 Coupling step
30 Storage mechanism
31 User Profile
32 Comparison mechanism
33 Comparison step
34 Comparison step
35 Determining mechanism
36 Determining step
37 Means for sending a message
38 Communication step

What is claimed is:

1. A device for recognizing wanted or unwanted telephone calls of a user of a telephone as a function of the user's behavior, comprising
  an interface to at least one telephone of the user;
  an interface to at least one media terminal, in particular a wireless device or a TV set;
  a mechanism for determining the input of a telephone call on the at least one telephone of the user;
  an examining mechanism for determining a spatial relationship between the at least one telephone of the user and the at least one media terminal;
  a mechanism for detecting the activation state of the at least one media terminal;
  a mechanism for tapping a media content playing on the at least one media terminal at the time point of the input of a telephone call on the user's telephone;
  a mechanism for extensively determining the user's behavior, whether the user accepts or rejects an incoming telephone call on the at least one telephone when the media content is playing;
  a mechanism for coupling the media content and the user's behavior relative to accepting or rejecting the incoming telephone call in an Event File;
  a storage mechanism for storing the Event File for creating a User Profile;
  a comparison mechanism for comparing the media content during an incoming call on the at least one telephone of the user with the media content of the Event Files of the User Profile stored in the storage mechanism;
  a mechanism for determining whether, as a result of the comparison, a call is wanted or unwanted.

2. The device according to claim 1, further characterized in that the mechanism is designed for tapping media content provided on the at least one media terminal, for analyzing an Electronic Program Guide transmitted on the at least one media terminal, and/or for detecting a channel by means of which the media content is shown on the at least one media terminal.

3. The device according to claim 1, further characterized in that the mechanism for tapping media content playing on the at least one media terminal is designed for content analysis of audio data or video data or text data.

4. The device according to claim 1, further characterized in that the mechanism is designed for coupling the media content, the user's behavior relative to accepting or rejecting the incoming telephone call, as well as the telephone number of the calling telephone in an Event File.

5. The device according to claim 1, further characterized in that the mechanism for determining whether a call is wanted or not wanted resulting from the comparison has means for sending a communication relative to the rejected call to a telephone of the caller and/or to the at least one telephone of the user when a call is rejected and/or that the mechanism for determining whether a call is wanted or not wanted resulting from the comparison has means for blocking, redirecting or relaying a rejected call.

6. The device according to claim 1, further characterized in that the device has a storage mechanism containing telephone numbers of preferred callers, which interacts with the mechanism for determining whether a call is wanted or not wanted resulting from the comparison.

7. The device according to claim 1, further characterized in that the device is provided in a telephone, in particular, a mobile telephone, or in a media terminal, in particular, a TV set or a wireless device radio.

8. A method for determining a User Profile for recognizing wanted or unwanted telephone calls of a user of a telephone as a function of the user's behavior, by means of a device that has an interface to at least one telephone of the user and an interface to at least one media terminal, in particular, a wireless device or a TV set, and that is designed, in particular, according to claim 1, characterized by the following steps:
  a determining mechanism of the device determines the input of a telephone call on the user's telephone;
  an examining mechanism of the device establishes a spatial relationship between the telephone of the user and the media terminal;
  a detection mechanism detects the activation state of the media terminal;
  a tapping mechanism taps the media content playing on the media terminal at the time point of the input of a telephone call on the user's telephone;
  a determining mechanism extensively determines the user's behavior, whether the user will accept or reject an incoming telephone call when the media content is playing;

a coupling mechanism links the media content and the user's behavior relative to accepting or rejecting the incoming telephone call in an Event File;

the Event File is stored in a storage mechanism for creating a User Profile.

9. A method for recognizing wanted or unwanted telephone calls of a user of a telephone as a function of the user's behavior by means of a device that has an interface to at least one telephone of the user and an interface to at least one media terminal, in particular, a wireless device or a TV set, and that is designed, in particular, according to claim 1, characterized by the following steps:

a determining mechanism of the device determines the input of a telephone call on the user's telephone;

an examining mechanism of the device establishes a spatial relationship between the telephone of the user and the media terminal;

a detection mechanism detects the activation state of the media terminal;

a tapping mechanism taps the media content playing on the media terminal at the time point of the input of a telephone call on the user's telephone;

a comparison mechanism compares the media content during an incoming telephone call to the user's telephone with the media content from Event Files of a User Profile, which are stored in the storage mechanism, whereby the Event Files are constructed as couplings of media content and the user's behavior relative to accepting or rejecting the incoming telephone call during the time period of transmission of the corresponding media content, a determining mechanism determines whether, as a result of the comparison, a call is wanted or unwanted.

10. The method according to claim 9, further characterized in that the User Profile containing the Event Files is created according to the method of claim 8.

11. The method according to claim 9, further characterized in that a determining mechanism extensively determines the user's behavior, whether the user accepts or rejects an incoming telephone call when the media content is playing, that a coupling mechanism links the media content and the user's behavior relative to accepting or rejecting the incoming telephone call in an Event File, and that the Event File is stored in the storage mechanism for updating the User Profile.

12. The method according to claim 8, further characterized in that the mechanism for tapping media content playing on the media terminal analyzes an Electronic Program Guide transmitted on the media terminal, and/or detects a channel by means of which the media content is shown on the media terminal.

13. The method according to claim 8, further characterized in that the mechanism for tapping media content playing on the media terminal analyzes the media content with respect to audio data and/or video data and/or text data.

14. The method according to claim 8, further characterized in that the Event File is generated by coupling the media content, the user's behavior relative to accepting or rejecting the incoming telephone call, as well as the telephone number of the calling telephone.

15. The method according to claim 9, further characterized in that, in determining that a call is wanted or unwanted resulting from the comparison, when the telephone call is rejected, a communication relative to the rejected call is sent to the telephone of the caller and/or to the telephone of the user, and/or the mechanism for determining whether, as a result of the comparison, a call is wanted or unwanted, if an incoming call is identified as rejected, blocks, redirects, or relays this call.

16. The method according to claim 9, further characterized in that the device has a storage mechanism containing telephone numbers of preferred callers, which interacts with the mechanism for determining whether a call is wanted or not wanted resulting from the comparison, so that in the case of an incoming call, the telephone number of the calling telephone is compared with the telephone numbers of preferred callers, and if the number is determined to correspond, the call is passed through to the telephone of the user, regardless of the media content.

* * * * *